Sept. 3, 1968 W. D. MAYNARD Re. 26,450

ELECTROMAGNETIC RELAY WITH SIMPLIFIED STRUCTURE

Original Filed Dec. 17, 1964

4 Sheets-Sheet 1

INVENTOR.
W. D. MAYNARD
BY Forest B. Hitchcock
HIS ATTORNEY

ELECTROMAGNETIC RELAY WITH SIMPLIFIED STRUCTURE

Original Filed Dec. 17, 1964 4 Sheets-Sheet 2

INVENTOR.
W.D.MAYNARD
BY Forest B. Hitchcock
HIS ATTORNEY

ELECTROMAGNETIC RELAY WITH SIMPLIFIED STRUCTURE

Original Filed Dec. 17, 1964 4 Sheets-Sheet 3

INVENTOR.
W. D. MAYNARD
BY
Forest B. Whitlock
HIS ATTORNEY

INVENTOR.
W. D. MAYNARD
BY Forest B. Hitchcock
HIS ATTORNEY

United States Patent Office

Re. 26,450
Reissued Sept. 3, 1968

26,450
ELECTROMAGNETIC RELAY WITH SIMPLIFIED STRUCTURE

Wheeler D. Maynard, Mendon, N.Y., assignor to General Signal Corporation, Rochester, N.Y., a corporation of New York Original No. 3,278,872, dated Oct. 11, 1966, Ser. No. 419,082, Dec. 17, 1964. Application for reissue Oct. 10, 1967, Ser. No. 682,692
16 Claims. (Cl. 335—185)

Matter enclosed in heavy brackets [ ] appears in the original patent but forms no part of this reissue specification; matter printed in italics indicates the additions made by reissue.

*ABSTRACT OF THE DISCLOSURE*

*A relay structure having moveable contacts carried by moveable card and an end support having window openings for insertion of coil springs for biasing fixed contacts and the card.*

The present invention relates to relays, and more particularly to an electromagnetic relay having improved structural and operating features with special emphasis on a simple, readily assembled type of relay with a high degree of operating efficiency.

In the present invention, it is proposed to provide a relay assembly so constructed that when the parts are placed in their proper positions, the correct tolerances are inherently provided. These tolerances provide for efficiency of electromagnetic operation, as well as continued long life of operation.

It is also proposed that the number of parts be kept to a minimum, and that the general assembling operation be a matter of merely inserting the various parts into proper positions and then holding these parts together by a pair of rivets.

In the assembly of most efficient type relays, it is necessary to employ highly skilled workmen; and, it is usually necessary to have each such relay adjusted and tested for certain definite characteristics. However, the construction proposed by the present invention permits the use of relatively unskilled workmanship; and yet the parts are precisely registered with one another to provide a compact operating relay not requiring further adjustment.

It is also the purpose of the present invention to provide proper alignment for the relay contacts with appropriate contact pressures to give accuracy of operation. The contact pressure for each contact is provided by a closely designed coil spring of relatively low rate inserted into the relay after the relay has been generally assembled.

Another feature of the present invention is to provide a relatively small number of operating contacts with each capable of carrying at least a kilowatt of energy for controlling lamps or other heavy duty equipment.

A further object of the invention is to provide an improved electromagnetic relay wherein the relative positioning of all of the movable components of the relay is precisely fixed by virtue of the features inherent in the structural components of the relay.

A still further object of this invention is to provide a relay assembly which permits its use for various applications, and yet is made up of components that are either molded or stamped and require no machining but when assembled provide great accuracy in the resulting combination.

Other objects of this invention will become apparent as its description is given in the specification with regard to the accompanying drawings which include:

FIG. 13 is a fragmentary view to show the holding means for the relay window; and FIG. 14 is a diagrammatic view to show the structure of the inserts which hold the contact fingers or blades.

Generally speaking, and without attempting to limit the scope of the present invention, the relay is comprised of a back member or structure and a spool member or structure all integrally molded together in a manner that the whole back structure can be mounted on a suitable mandrel for winding the turns of insulated wire on the spool.

When the winding is completed, terminals 6 and 7 are snapped into position, and the ends of the windings are connected to such terminals. The pusher member PM (or card structure) is then placed in position on the armature A. The armature A is then placed in a proper position with respect to the back member and also with regard to the front of the winding spool. The core C is then inserted into the spool and back member through an opening in the armature to thus hold the armature in its proper position. The residual strip is inserted into position. The contact fingers are mounted in appropriate positions on the back member with suitable inserts between them to properly align them on the back member. The front member and cover are then suitably placed into positions appropriately receiving the core and contact fingers. The assembly can now be riveted to hold all these members in their appropriate positions. The coil biasing springs are placed into position through the windows in the front member. The front window is then snapped into position to complete the relay.

Figure 1:
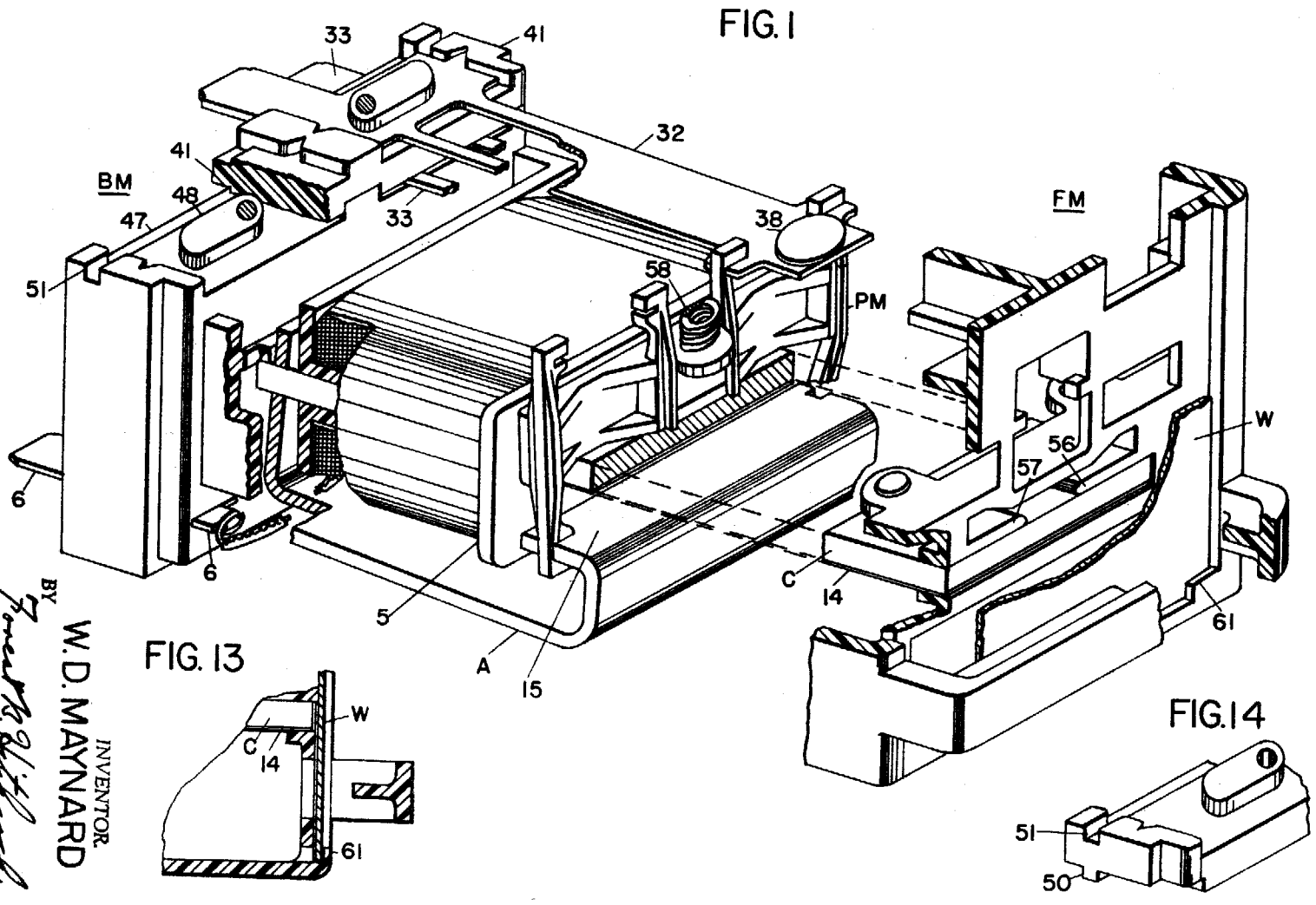
FIG. 1 is an isometric view of the partially disassembled relay showing how the core structure is attached to the rear member of the relay and how the front member and cover are initially located by the extending portion of the core.
Figure 2:
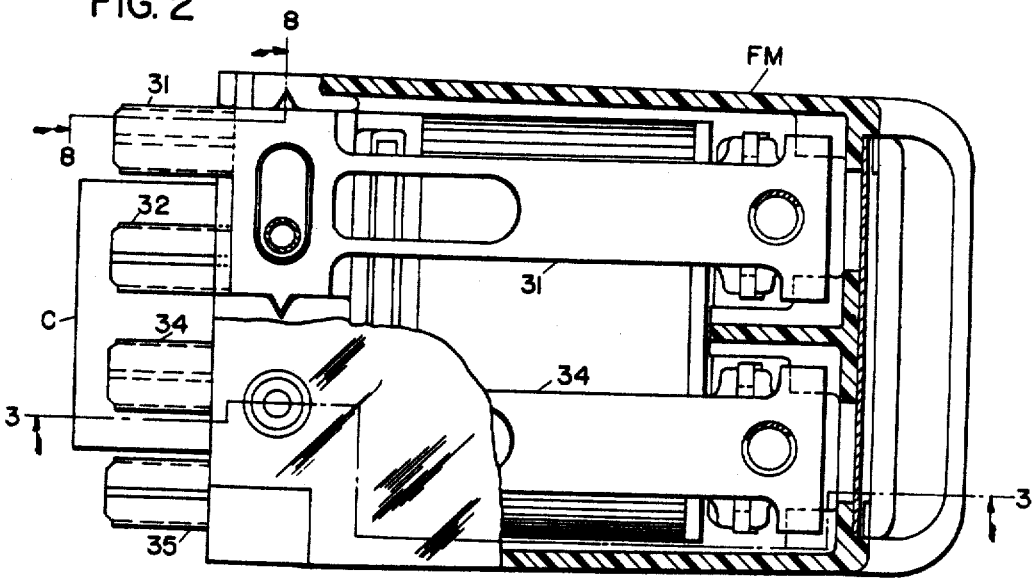
FIG. 2 is a sectional top view of the relay with a portion of its cover removed to readily illustrate the structural features of the relay when assembled.

Referring now to FIG. 1, it will be noted that the back member BM has the spool member 5 molded so as to be integral therewith. There is a separating interior space between the spool 5 and the back member BM which is closed at the sides as seen in FIGS. 1 and 2. This space provides room for mounting the armature A and also room for air circulation about substantially the entire surface of the spool 5 for heat radiation purposes.

Figure 6:
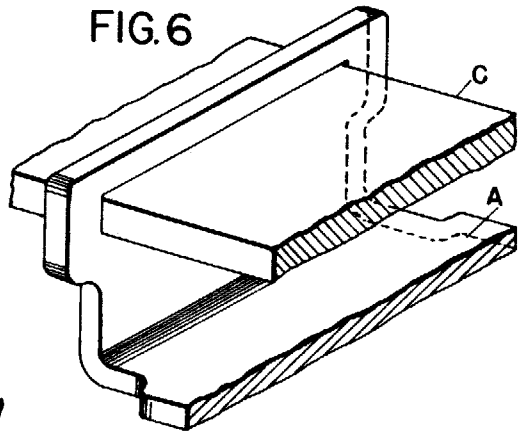
FIG. 6 is an isometric view of the armature hinged upon the core piece.

When the wire is wound on the spool 5, the two ends thereof can be suitably connected to their respective terminals 6 and 7 which the operator inserts into the back member BM. These connections from the winding on the outside of the spool 5 to the solder tabs on their respective terminals pass through the space provided by the recess on the side of the armature A, probably best seen in FIG. 6.

Figure 9A:
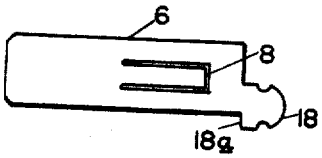
FIG. 9A is a top view of a coil terminal.
Figure 9C:
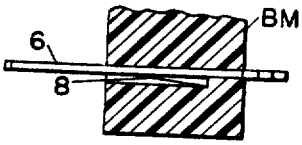
FIG. 9C is a sectional side view of a coil terminal in position.
Figure 9B:
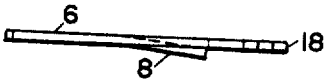
FIG. 9B is a side view of the coil terminal shown in FIG. 9A.

A terminal 6 is shown in FIGS. 9A and 9B with its retaining finger 8 in its normal biased position and the soldering tab 18 at the right end of the terminal with a projection 18*a*. The FIG. 9C shows this terminal 6 moved to the left into the opening in the back member BM until the finger 8 snaps into position to hold the terminal within the back member with the projection 18*a* preventing the terminal 6 from further entering the back member BM.

Figure 12:
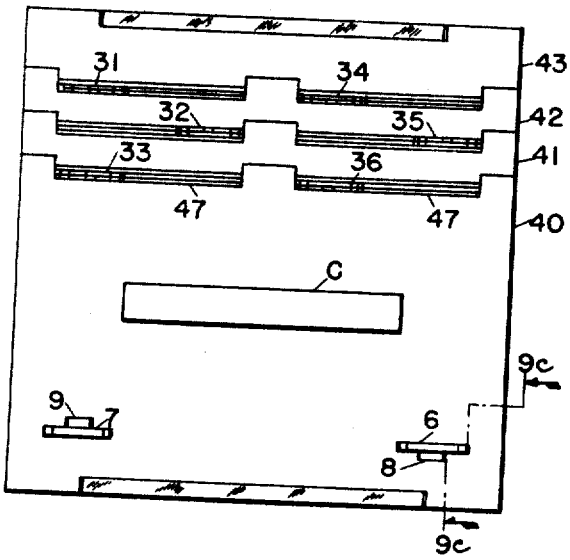
FIG. 12 is a back view of the relay.

Referring to FIG. 12, it will be seen that the slot for the finger 8 is beneath the slot for the entire terminal; whereas, the slot for finger 9 on terminal 7 is above the entire slot. This makes it so that the same terminals may be used for the right and left hand sides of the relay with their respective solder tabs extending outwardly to their respective sides of the relay. For example, the solder tab 18 of terminal 6 can be seen at the left-hand side of its slot in FIG. 1.

The pusher member PM has its lower legs fitted into the slots on the forward end of the armature A as is best seen in FIG. 1. When this is done, the rear of the armature A is fitted into the recess of the rear of the winding spool and its forward end raised so as to allow the core C to be pushed through between armature A and pusher member PM into the hole or recess in the spool and back member.

The core C is perfectly straight and is the right size to slip through the center of the spool 5 and back member BM. If the core C is slipped into position part way, then the armature A can be positioned in the space between spool 5 and back member BM so as to have the armature slot receive the core C which passes through it into the back member BM until the holes in such core C match the holes in the back member (see FIG. 3). When the core is in proper position, the eyelets 10 and 11, which are straight tubular members each with one end slightly crimped, can be temporarily pushed upwardly through the holes in the back member to hold the core C in its position (see FIG. 3). These rivets or eyelets 10 and 11 are placed in their respective holes with their crimped ends at the bottom of the back member BM so that their upwardly extending ends can readily receive the spring contact fingers and their respective separators as presently to be described. In mass production, these eyelets are not inserted until the cover is in position.

The contact group includes six contact fingers or blades 31, 32, 33, 34, 35 and 36 which are mounted in pairs between separators 41, 42 and 43. These fingers or blades can be seen in a side view shown in FIG. 3; in a front view shown in FIG. 4; and in a back view shown in FIG. 12. Two of these fingers are back contacts; two of these fingers are front contacts; and the remaining two are heel contacts movable between the front and back points or positions. These fingers are made of non-oxidizing nickel silver alloy with a partial spring temper.

Figure 10A:
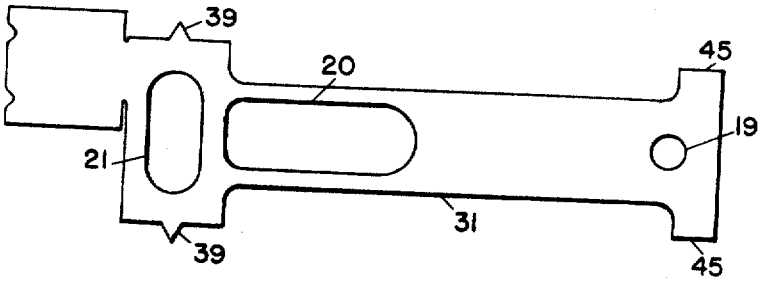
FIG. 10A is a top view and formation procedure for a front or back contact spring or blade.
Figure 11A:
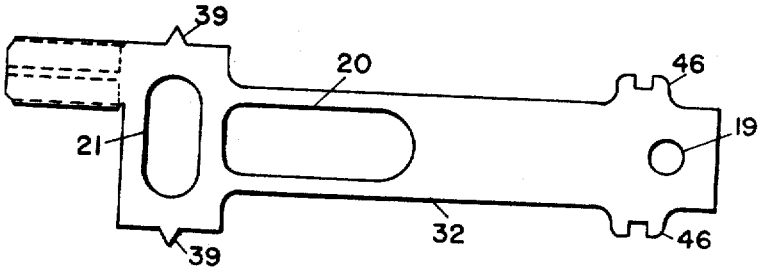
FIG. 11A shows a movable contact finger or blade in its formed condition.
Figure 10B:
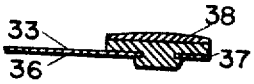
FIGS. 10B and 10C show back and front contact points for their respective contact fingers.
Figure 10C:
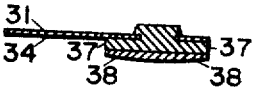

The finger blanks, as formed by a cutting die from flat material, are shown in FIGS. 10A and 11A. The blanks of FIG. 10A are used for the front and back contact fingers, while the blanks of FIG. 11A are used for the heel contact fingers. It is noted that at the left-hand of each of these blanks an extending portion is die cut to have its upper and lower wings turned under to form a connector portion. The same formation of the connector portion of the fingers applies to both FIGS. 10A and 11A. The connector portions of the finger blanks of FIG. 10A are unfolded in the upper left, but in FIG. 11A, they are folded into position. The right-hand ends of these fingers are formed with holes 19 for receiving the contact buttons or points themselves. The contact finger blanks of FIG. 10A are made with two back contacts 33 and 36 as shown in FIG. 10B, and two front contacts 31 and 34 as shown in FIG. 10C. Two contact finger blanks of FIG. 11A are provided with contacts as shown in FIG. 11B.

Figure 11B:
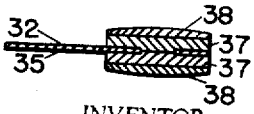
FIG. 11B shows the contact points in position on their respective movable contact fingers.

The contact points or buttons of FIGS. 10B, 10C and 11B are in two parts having the base portion 37 which is of non-oxidizing nickel silver alloy Type D of ASTM designation B206–56 (annealed) as set forth in the American Society for Testing Materials, 1961, page 254. The faces 38 of the points (or contacts) are preferably formed of an alloy comprising ten percent cadmium oxide and ninety percent silver. These contact faces are sweated onto their base portions. The front and back contacts of FIGS. 10B and 10C have their base portions inserted into the holes 19 of the contact fingers. The portions extending through the holes are pressed, forming receiving buttons for the coil spring biasing means later to be discussed. In FIG. 11B, the two base portions of the contacts are positioned in the hole 19 and are welded together and to the finger by a spot welding process.

It is noted that the front and back contact fingers of FIG. 10A have the extending portions 45 adapted to rest against suitable abutments later to be described with regard to the front member FM. The heel contact fingers of FIG. 11A have extending bifurcated portions 46 for coacting with the pusher member PM later to be described.

Each of the finger blanks of FIGS. 10A and 11A are provided with a hole or slot 20 which reduces the finger cross sectional area and thus reduces the spring tension of the finger so that it is relatively weak compared to its coil spring biasing means later to be described in detail. In addition, each finger has an opening 21 which is for receiving a protruding portion 48 on its mounting adapted to generally align the finger in proper position; but the actual position of the finger is determined by the projecting sharp prongs 39. These oval protruding portions 48 also give added insulation and creepage distance between contact fingers and the rivets 10 and 11.

To assemble the contact group, two back contact fingers 33 and 36 are first placed in position on block 40. Insert 41 is placed over the top of them and slightly pushed into position. Then two heel contact fingers 32 and 35 are inserted in pusher PM and then placed in position on the insert 41. Insert 42 is put in position and slightly pressed. The two front contact fingers 31 and 34 are then placed in position on insert 42 followed by the addition of the top insert or member 43. A press pressure can now be applied on the top member 43 so as to force all of the contact fingers and their inserts into a tight proper position.

Since each contact finger has the wings of its connector portion bent downwardly and underneath, there is a slot 47 in the main block 40 for receiving the extra thickness of such portion of contacts 33 and 36. This slot 47 can be seen in FIG. 1 and in FIG. 12 as well as in FIG. 3. Similar slots are provided on the upper and lower rear edge of each of the inserts 41 and 42. This structure then permits the fingers 32 and 35 to be positioned as viewed in FIG. 12. Also, all inserts 41 and 42 are alike.

Figure 8:
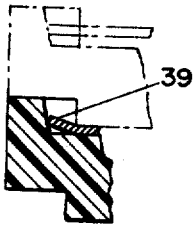
FIG. 8 is an expanded view showing the assembling of a contact on the back member of the relay and its manner of being positioned with respect thereto as the assembling progresses.

It will also be noted that, during this pressing process, the extensions 39 on the fingers are bent upwardly as shown in FIG. 8, by the dotted lines and full lines of FIG. 8 both for positioning and locking purposes. It can be seen that these receiving triangular shaped indentations in the appropriate portions of member 40 and the inserts (such as insert 41 of FIG. 1) are so shaped as to have the point receiving portion thereof sloped as can be seen in FIG. 8. Also, the other clearances with regard to these projections 39 are in the order of two thousandths of an inch. Since these projections then are at substantially separated points on the contact finger and are accurately positioned, each of the contact fingers then extend appropriately forward of the relay. In addition, each of the inserts also has a projection 50 (see FIG. 14) at each end for being received in an alignment slot 51. These alignment slots and projections have clearances in the order of two thousandths of an inch. Thus, the inserts properly align themselves.

As above explained, the pusher member PM (see FIG. 1) is attached as shown in FIG. 1 to the armature A which has receiving indentations for the lower two projecting arms or legs of the pusher member PM. These two arms are spread slightly and slipped into position until they snap into the indentations on the armature. There are two pairs of extending arms on the upper portion of the pusher PM, with each pair receiving its respective heel contact finger. When these are snapped into position, the pusher member PM is held upright. Also, the underside of the cross member of the pusher member PM is resting on the upper side of the extending core C in its appropriate normal position. The residual strip 14 may be inserted between the lower side of core C and the spool 5 before the pusher member PM is positioned. If it is not inserted then, it should be inserted before the cover is positioned.

The eyelets 10 and 11 can now be removed, if they are in position, and the front member FM and cover brought into position so that the core C and residual are appropriately received by pushing the molded arms 56 and 57 slightly upward. Also, the front contact fingers may need to be pushed slightly upward by passing an instrument through their respective windows shown in FIG. 5 so that they are above the projections 54 and 55. Similarly, the back contact fingers may need to be pushed slightly below the projections 54 and 55. This allows the front member to take its appropriate position with the cover being received by the back member BM. The eyelets 10 and 11 are then inserted through the holes of the parts including the cover. The parts are then placed in the press and the eyelets are caused to have their upper ends crimped to tightly hold the relay structure together.

Figure 4:
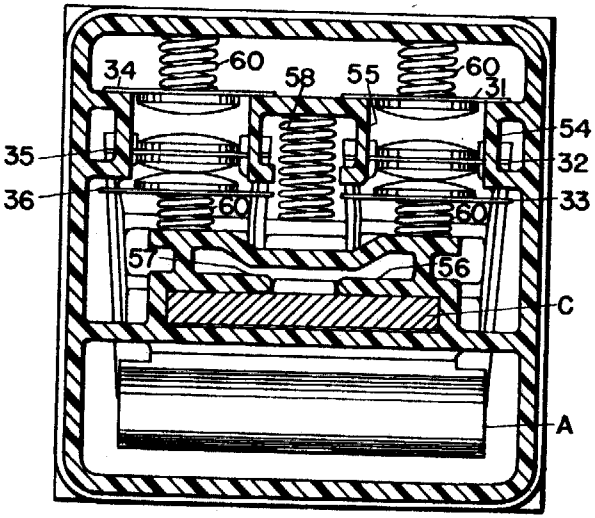
FIG. 4 is a front sectional view taken on line 4—4 of FIG. 3 viewed in the direction of the arrows.

A coil spring 58 of suitable length and requiring compressive energy of a given value is then passed through the window in the front member and placed over the receiving button on the pusher member PM and sufficiently compressed that it is received by the button on the upper portion of the front member as seen in FIG. 4. In a similar way, the somewhat shorter coil spring biasing means 60 are inserted through the windows in the front member FM to be received by their appropriate buttons on the frame of the front member and the buttons on their respective contact fingers 31, 33, 34 and 36. It is assumed that suitable spring compressing tools are used for this spring placing process.

Figure 5:
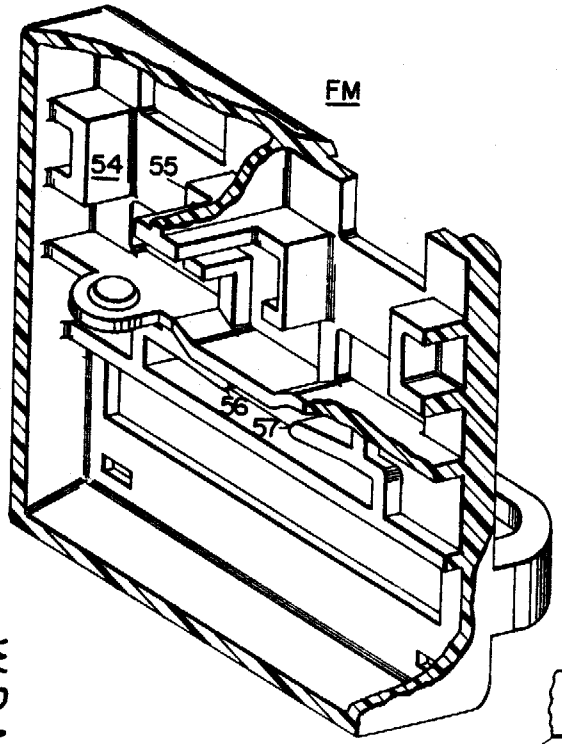
FIG. 5 is a sectional view of the front member portion of the relay cover and its parts that intimately contribute to the characteristics of the relay.

When the above has been completed, the window W is snapped into position behind its four retaining nubs 61 at each of the four corners of its receiving recess. One of these extending nubs 61 is shown in FIG. 1 and another in FIG. 13. These small nubs or extensions of the front member hold the window W in place. The nub 61 in the lower left of the relay front member FM is shown in FIG. 13. This cross sectional view shows that the nubs 61 can be molded because of the windows in back of them as shown in FIGS. 5 and 13.

Since the assembly of the relay has been completed as above described, some of the characteristics of the relay will now be discussed.

Figure 3:
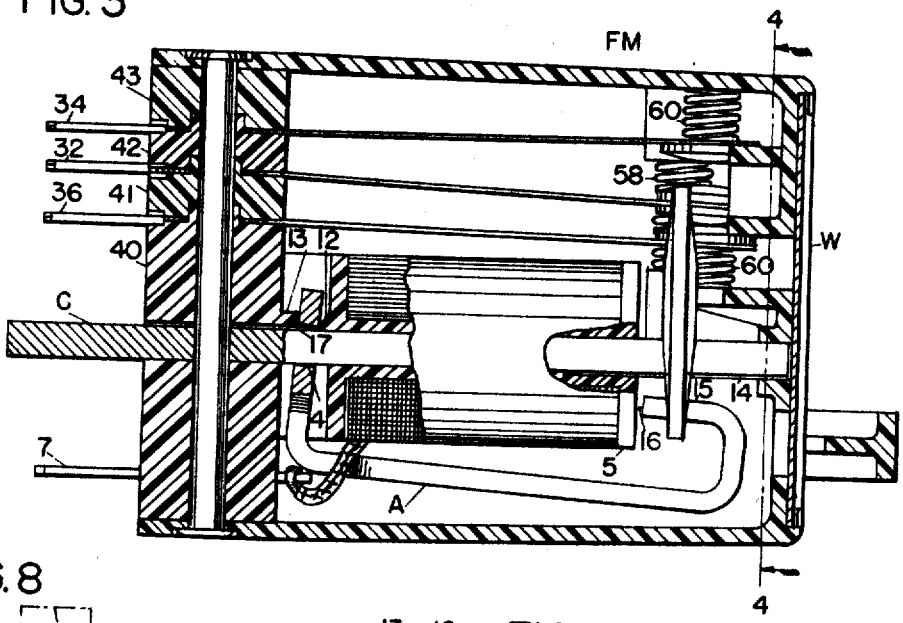
FIG. 3 is a side view of the relay with certain parts shown in section to illustrate various structures and features of the relay when it is completely assembled.
Figure 7A:
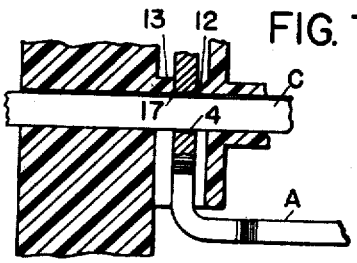
FIG. 7A is a sectional side view of the armature hinge illustrated in FIG. 3, but with the armature in a raised position.

Referring to FIGS. 1 and 3, it will be noted that the forward end of the armature A is looped or turned counter clockwise so as to provide an end 16 directly facing the spool 5 with its windings. The upper flat surface 15 of the loop is exactly in line with the lower flat surface 4 of the slot at the rear of the armature A receiving the core C. Thus, when the armature becomes attracted, the surface 15 is flat against the residual strip 14, and the flat surface 4 of the armature slot receiving core A is flat against the core. Actually the armature A rocks at its hinge point so as to have its flat portion merely assume a position resting squarely against the flat surface of the projection 13 as shown in FIG. 7A when the relay is fully energized. Looking at FIG. 7A it will be noted that there is a small space between the armature and the projection 12 and substantially the same space is found in FIG. 3 where the relay is deenergized. However, should vibration or otherwise cause the armature A to move while it is in its deenergized position as shown in FIG. 3, it would merely abut against the surface of the projection 12; but, does not particularly rub against the projection 12 during regular operation.

Figure 7B:
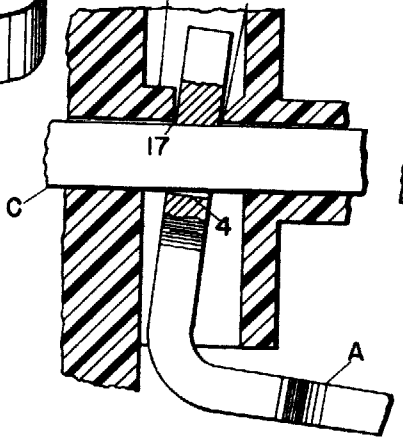
FIG. 7B is a sectional side view of the armature in a pendant position.

In this connection, it will be noted that FIG. 7B is twice the size of FIG. 7A so as to illustrate that when the armature is pendant, it assumes its lower position in accordance with the slot in the armature rather than because of the abutments 12 and 13. In other words, the armature is free to swing downward as limited by the slot but may abut against either projection 12 or projection 13 depending upon the circumstances. It is noted that should the relay be vibrated so as to tend to move the position of the armature while it is energized, the projection 12 has a sufficiently broad flat surface so that the armature in its raised position does not become attached thereto because of the five or six degree slope of the upper surface of the slot as viewed in FIG. 7A. This particular construction of the armature and its hinge causes the organization to be of long life as well as to provide efficient relay operation. The armature A and the core C are made of Armco magnetic ingot iron (high purity) which is properly annealed to give it high magnetic permeability characteristics.

The plastic arms 56 and 57 are so molded integrally with the front member FM that they provide a continuous downward pressure on the core C, as viewed in FIGS. 1, 4 and 5. This continual tension prevents any looseness in the core from developing and positively positions it against the residual strip 14 in a permanent position.

The coil spring 58 which biases the pusher member PM and armature A to a downward position has a tension measuring approximately 115 grams. This coil spring has linear characteristics in that substantially the same pressure is supplied to the pusher when the armature is in both its deenergized and energized positions. The remaining coil springs 60 for the respective contacts are all alike and have linear characteristics supplying approximately twenty-two grams of pressure to each of their contacts. This is substantially greater than the contact finger pressures which may require seven or eight grams for movement. In other words; any slight variation in the level or natural positioning of the contact fingers is easily overcome by their main biasing springs. These biasing springs 60 together with the weight of the armature and the other factors involved gives a net sixty to seventy grams downward pull on the armature in its released position.

The coil springs 58 and 60 are known as low rate coil springs. In particular, the coil springs 60 have a relatively low spring constant of approximately 55 grams per inch. Prior to assembly the springs are approximately $\frac{9}{16}$ of an inch long and, are compressed to an approximate length of $\frac{5}{32}$ of an inch when in their assembled position within the relay structure. This results in a spring produced contact pressure approximately 22 grams. Since the armature movement is relatively small in the order of 1/32 of a inch, the contact pressure remains substantially constant. In other words, the placement of the springs in their respective positions requires a compression which is many times greater than the deflection of the spring during the relay operation. For this reason, the contact pressure remains substantially constant throughout the life of the relay.

From the above description with respect to the drawings, it will be understood that a compact relay has been disclosed which is readily assembled and which provides simple and efficient operation. This relay has been shown in the drawings (except FIG. 7B) at twice its planned size. From this it can be seen that this relay is so constructed as to provide control for substantial surges in current and yet it is relatively small. Once the parts have been made by casting and die cutting, they readily assemble in an accurate fashion to provide the desired relay operation. The magnetic portion of the relay is supplied with an adequate cross sectional area of iron in its core and armature as to effectively operate at an efficient point on their magnetization curve. The armature in surrounding the winding on the spool absorbs much of the leakage flux and thus makes it possible for these relays to be closely nested and yet have little or no effect on each other.

Having thus described one rather specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice without in any manner departing from the spirit or scope of the present invention.

What I claim is:

1. An electromagnetic relay, comprising (a) a magnetic core;

(b) an energizing winding mounted on said core;

(c) a back insulator member mounted on the rear of said core;

(d) an armature pivotally mounted on the rear of said core and extending around said winding toward the front end of said core to form a working airgap.

(e) a movable card mounted on the front end of said armature and acting to limit the opening of said working airgap by contacting the upper side of said core;

(f) a plurality of contact blades each having one end fixed by said back insulator member and certain of which have their extending ends carried by said movable card to selectively engage the extending ends of those contact blades not carried by said movable card in accordance with the operating position of said armature;

(g) a front insulator member having register surfaces therein for receiving the extending end of said core and for positioning the unengaged extending ends of those contact blades not carried by said movable card, said insulator member having cover means integrally connected thereto for extending backwardly and attaching to said back insulator member, and said front insulator member also having window openings therein;

(h) coil spring means operatively positioned through the window openings in said front insulator member for biasing said card with its armature towards its released position;

(i) other coil spring means positioned through said window openings in said front insulator member to bias the extending ends of those contact blades not carried by said movable card to their respective unengaged positions;

(j) and a transparent window pane attachable to said front insulator member and covering all of its window openings.

2. A relay structure according to claim 1 wherein the front insulator member has integral spring arms adjacent the register surface for receiving the core, which spring arms are effective to constantly bias and hold said core against its register surfaces.

3. A relay structure according to claim 1 wherein said armature is of a broad U-shape with the forward leg of the U-shape being bent inwardly to form a working airgap.

4. A relay structure according to claim 1 wherein a strip of thin plastic sheet material is mounted on said core within said working airgap to determine the minimum value of such airgap.

5. In an electromagnetic relay structure, a straight flat core, a moulded winding spool having a longitudinal slot for receiving said core, a back portion integrally moulded to said winding spool with a transverse slot crossing said longitudinal slot at right angles, an armature having inner and outer ends, said inner end being turned and having an opening in the turned portion, said turned *portion* being inserted into said transverse slot followed by the insertion of said core into said longitudinal slot and through said opening in said armature, and said armature having a flat portion extending along and outside said winding spool toward said outer end, and said armature also having a reverse turn at its outer end to cause the end of said armature to face inwardly toward said winding and thereby form a flat upper portion adjacent said core to provide a working airgap with said core.

6. An assembly for insulatively positioning a plurality of contact blades of a relay or like switching device in precise alignment one above the other, (a) a plurality of insulative wafers configurated to be stacked one above the other, each of said insulating wafers including at least one contact slot of sufficient depth and width to receive a respective contact blade, (b) the side edges of said contact slot being formed with oppositely disposed V-shaped notches having sidewalls that slope inwardly in the direction toward the bottom surface of said contact slot, (c) each contact blade having a width substantially the same as the width of its associated contact slot and being provided with V-shaped projections at the side edges thereof adapted to mate into the V-shaped notches in the side edges of its associated contact slot when said contact blade is inserted into said slot, the lateral dimension between the points of the V-shaped projections on a contact blade being slightly greater than the lateral dimension between the points of the V-shaped notches when measured along the bottom surface of said contact slot;

(d) whereby said V-shaped projections on the side edges of a contact blade embedded into the sloping sidewalls of said mating V-shaped notches when the contact blade is urged against the bottom surface of its respective contact slot when the insulating wafers are stacked one above the other and the resulting stack is then compressed together.

7. In an electromagnetic relay, (a) an insulative member having a first transversely disposed opening formed therein to provide a space between first and second portions of said insulative member and a second opening substantially rectangular in cross-section and extending longitudinally through said first and second portions of said insulative member, intersecting said space between said first and second portions, said first portion being configurated to mount relay contact blades at a rear end of said relay and said second portion being forward of said first portion and having a spool-like shape, (b) an armature adapted to be received in the transverse space between the first and second portions of said insulative member and having a substantially rectangular aperture therein adjacent one end thereof and disposed to be in substantial alignment with the longitudinal opening in said insulative member when said armature is in assembled position, (c) an elongated magnetic core substantially rectangular in cross-section slidably mounted through the longitudinal opening in said insulative member and the rectangular aperture in said armature, said core being of a length such that one end thereof extends outward from said insulative member forward of said second portion and, the aperture in said armature being slightly larger than the cross-section of said core, whereby said one end of the armature is retained within the space in said insulative member for pivotal movement of the opposite end relative to the forward end of said core, (d) an energizable coil wound around the spool-like second portion of said insulative member to encompass said core, and (e) a plurality of contact blades each having one end fixedly mounted on the first portion of said insulative member and certain of which have their extending ends operatively connected to said armature so as to selectively engage others of said contact blades as the armature moves toward and away from said core in accordance with the energization of said coil.

8. An electromagnetic relay comprising, (a) a magnetic core, (b) energizable winding on said core, (c) an insulator member for fixedly mounting one end of said core, and (d) an armature having one of its ends pivotally mounted adjacent said one end of said core, said armature extending in the same direction as the opposite end of said core and being curved back adjacent the opposite end of said core to have a portion thereof extending along but spaced by a working airgap from one surface of said core.

9. In an electromagnetic relay having a core structure, (a) an armature pivotally mounted at one end with its free extending end movable to operated and released positions relative to said core, said armature having a pair of oppositely disposed transverse notches at the side edges thereof adjacent its free extending end, (b) a plurality of contact blades each having one end fixed and the other end extending substantially parallel with said armature, certain of said contact blades being movable to selectively engage those of said contact blades in accordance with the position of said armature, each of said movable contact blades having a pair of oppositely disposed transverse notches in the side edges thereof adjacent its extending end, and (c) an insulative member having a plurality of integrally formed, yieldable extending portions each having a notch therein and being disposed laterally in pairs to receive respectively said armature and said movable contact blades.

10. In a relay, (a) a back insulator member, (b) a magnetic core having one end affixed to said back insulator member, (c) an energizable winding on said core, (d) an armature pivotally mounted adjacent said fixed end of said core to have its free end movable towards and away from the extending end of said core in accordance with the energization of said winding, (e) a plurality of fixed and movable contact blades each having one end fixed to said back insulator member and having their free ends extending substantially parallel with said core, the free ends of said movable contact blades being operatively connected to said armature to selectively engage the fixed contact blades in accordance with movement of said armature towards and away from said core, (f) an insulative casing open at one end and having registered surface means therein at the opposite end to respectively define the position of the extending end of said core and the unengaged positions of said fixed contact blades and having sidewalls configurated to completely enclose the operating elements of said relay, (g) said back insulator member having integral shoulders therein adapted to mate with the ends of two sidewalls of said casing to define the positioning of said casing, and (h) the other sidewalls of said casing being slightly longer than said first sidewalls to overlap a portion of said back insulator member to permit the anchoring of said casing to said back insulator member.

11. A relay as specified in claim 10 wherein said casing includes an aperture at said registering end thereof adapted to receive the extending free end of said core, and said casing being formed with resilient integral projections normally extending yieldably into said aperture for resiliently retaining said core within said aperture.

12. The relay as claimed in claim 10 wherein said registering end of said casing is provided with apertures to permit manipulation of the operating elements of said relay while enclosed in said casing, and further including a sheet of insulating material adapted to be affixedly attached in front of said registering end of the casing to completely seal said registering end.

13. In a relay, (a) a spool of insulating material having an aperture therethrough of substantially rectangular cross section and a contiguous recess adjacent one thereof, (b) a magnetic core of rectangular cross section adapted to be slidably mounted within said spool with the opposite ends extending therefrom, (c) an energizable coil wound around said spool, (d) an armature pivotally mounted adjacent one end of said core and extending outside said spool to the opposite end of said core but spaced therefrom to form a working airgap, (e) an insulated frame including a rectangular aperture adapted to receive the forward end of said core, and (f) a sheet of non-magnetic material configurated to be supported at one end by the recess formed in the forward portion of said spool and at its other end within the core supporting aperture in said insulative frame, whereby said sheet of non-magnetic material is disposed along one surface of said core to serve as the residual airgap of said relay during operation of said armature.

14. In a relay, (a) a magnetizable core, (b) an armature pivotally mounted adjacent one end of said core and extending towards but spaced by a working airgap from the opposite end of said core, (c) a plurality of fixed and movable contact blades each having one end fixed and having their other ends extending substantially parallel with said core, the extending ends of said movable contact blades being operatively connected to the extending end of said armature to selectively engage the fixed contact blades in accordance with the operation of said armature, (a) a frame of insulating material secured to the extending end of said core and including registration surface means therein for respectively determining the unengaged positions of the extending ends of the fixed contact blades, each contact blade being provided at its extending end with a contact element, and (e) spring means operatively positioned in said insulating frame directly in alignment with the contact elements of each fixed contact blade for continually biasing each fixed contact blade towards its unengaged position.

15. The relay specified in claim 14 wherein (a) each fixed contact blade includes a hole adjacent its extending end, and including (b) a button like member configurated to be received in said hole and being formed at one surface to receive the contact element associated with that fixed contact blade and being shaped at its opposing surface in the form of a spring seat for mounting the associated spring means utilized to bias said fixed contact blade towards its unengaged position.

*16. An electromagnetic relay, comprising*

*(a) a magnetic core;*

*(b) an energizing winding mounted on said core;*

*(c) a back insulator member mounted on the rear of said core;*

*(d) an armature pivotally mounted on the rear of said core and extending around said winding toward the front end of said core to form a working airgap;*

*(e) a movable card mounted on the front end of said armature and acting to limit the opening of said working airgap by contacting the upper side of said core;*

*(f) a plurality of contact blades each having one end fixed by said back insulator member and certain of which have their extending ends carried by said movable card to selectively engage the extending ends of those contact blades not carried by said movable card in accordance with the operating position of said armature;*

*(g) a front insulator member having register surfaces therein for receiving the extending end of said core and for positioning the unengaged extending ends of those contact blades not carried by said movable card, said insulator member having cover means integrally connected thereto for extending backwardly and attaching to said back insulator member, and said front insulator member also having window openings therein;*

*(h) coil spring means operatively positioned through the window openings in said front insulator member for biasing said card with its armature towards its released position;*

*(i) other coil spring means positioned through said window openings in said front insulator member to bias the extending ends of those contact blades not carried by said movable card to their respective unengaged positions.*

References Cited

The following references, cited by the Examiner, are of record in the patented file of this patent or the original patent.

UNITED STATES PATENTS 2,632,071 31953 Rinke ---------- 335—187

BERNARD A. GILHEANY, *Primary Examiner.*

H. BROOME, *Assistant Examiner.*